US012528213B2

(12) United States Patent
Kilsby

(10) Patent No.: US 12,528,213 B2
(45) Date of Patent: Jan. 20, 2026

(54) SHAVING DEVICE

(71) Applicant: KAROSSMATIC PTY LTD, Mundingburra (AU)

(72) Inventor: Olivia Jane Kilsby, Mundingburra (AU)

(73) Assignee: Karossmatic Pty Ltd., Mundingburra (AU)

( * ) Notice: Subject to any disclaimer, the term of this patent is extended or adjusted under 35 U.S.C. 154(b) by 727 days.

(21) Appl. No.: 18/251,851

(22) PCT Filed: Jul. 22, 2020

(86) PCT No.: PCT/AU2020/050750
§ 371 (c)(1),
(2) Date: May 4, 2023

(87) PCT Pub. No.: WO2021/012006
PCT Pub. Date: Jan. 28, 2021

(65) Prior Publication Data

US 2023/0415366 A1 Dec. 28, 2023

(30) Foreign Application Priority Data

Jul. 22, 2019 (AU) ................................ 2019902585

(51) Int. Cl.

| | |
|---|---|
| ***B26B 21/22*** | (2006.01) |
| ***B26B 21/40*** | (2006.01) |
| ***B26B 21/44*** | (2006.01) |
| ***B26B 21/52*** | (2006.01) |

(52) U.S. Cl.
CPC .......... *B26B 21/222* (2013.01); *B26B 21/405* (2013.01); *B26B 21/443* (2013.01); *B26B 21/522* (2013.01); *B26B 21/527* (2013.01)

(58) Field of Classification Search
CPC ... B26B 21/222; B26B 21/405; B26B 21/443; B26B 21/522; B26B 21/527
See application file for complete search history.

(56) References Cited

U.S. PATENT DOCUMENTS 5,692,529 A * 12/1997 Fekete .................. B26B 21/522 30/526
6,018,877 A * 2/2000 Greene ................ B26B 21/527 30/526
(Continued)

FOREIGN PATENT DOCUMENTS

| | | |
|---|---|---|
| DE | 10 2016 123 979 A1 | 6/2018 |
| WO | WO 2010/048994 A1 | 5/2010 |
| WO | WO 2016/203326 A1 | 12/2016 |

OTHER PUBLICATIONS

International Search Report received in International Application No., PCT/AU2020/050750, mailed on Sep. 21, 2020, in 3 pages.

*Primary Examiner* — Omar Flores Sanchez
(74) *Attorney, Agent, or Firm* — Knobbe, Martens, Olson & Bear, LLP

(57) ABSTRACT

A shaving device including a body having an upper surface configured to fit in the palm of a user's hand, the shaving device further including at least one blade mounting portion associated with a lower surface of the body, the blade mounting portion configured to retain one or more cutting blades thereon.

21 Claims, 4 Drawing Sheets

(56) References Cited

U.S. PATENT DOCUMENTS

| | | | | | |
|---|---|---|---|---|---|
| 6,052,905 | A * | 4/2000 | Branchinelli | B26B 21/4081 | 30/526 |
| 8,782,911 | B1 * | 7/2014 | Greene | B26B 21/52 | 30/526 |
| 10,137,586 | B1 * | 11/2018 | Strong | B26B 21/525 | |
| 10,780,597 | B2 * | 9/2020 | Petersen | B26B 21/525 | |
| D981,040 | S * | 3/2023 | Parry | D28/45 | |
| 11,878,437 | B1 * | 1/2024 | Baldwin | B26B 21/527 | |
| D1,025,486 | S * | 4/2024 | Baldwin | D28/46 | |
| 2005/0246906 | A1 * | 11/2005 | Greene | B26B 21/40 | 30/526 |
| 2007/0220752 | A1 * | 9/2007 | Psimadas | B26B 21/00 | 30/34.05 |
| 2016/0151924 | A1 * | 6/2016 | Gers-Barlag | B26B 21/522 | 30/526 |
| 2017/0190065 | A1 * | 7/2017 | Pound | B26B 21/522 | |
| 2018/0117781 | A1 * | 5/2018 | Gonterman | B26B 21/222 | |
| 2023/0256636 | A1 * | 8/2023 | Kohut | B26B 21/521 | 30/526 |

* cited by examiner

SHAVING DEVICE

TECHNICAL FIELD

The present invention relates to a shaving device. More particularly, the present invention relates to a shaving device for shaving hair from the skin of a person.

BACKGROUND ART

Known shaving devices for shaving hair from the skin of a person suffer from the disadvantage of not providing an indication of whether the skin area to be shaved, particularly body skin areas not clearly visible (such as the legs), are shaved properly. Typically, the user will need to hold a razor in one hand and use the other hand to feel the skin area being shaved. This can be awkward if the user is standing, and potentially dangerous if the user is in a shower.

Further, known handheld razors such as those utilising a handle on which a razor head is mounted may not provide the necessary control to shave certain skin areas such as a male user's head.

Thus, there would be an advantage if it were possible to provide a shaving device that was convenient and simple to use, but also provided a user with improved control during use.

It will be clearly understood that, if a prior art publication is referred to herein; this reference does not constitute an admission that the publication forms part of the common general knowledge in the art in Australia or in any other country.

SUMMARY OF INVENTION

The object of the present invention is to provide a shaving device which may at least partially overcome at least one of the aforementioned disadvantages or provide the consumer with a useful or commercial advantage.

With the foregoing in view, the present invention in one form, resides broadly in a shaving device comprising a body having an upper surface configured to fit in the palm of a user's hand, the shaving device further comprising at least one blade mounting portion associated with a lower surface of the body, the blade mounting portion configured to retain one or more cutting blades thereon.

In another aspect, the invention resides broadly in a shaving device comprising a body having an upper surface configured to fit in the palm of a user's hand, the shaving device further comprising at least one cutting blade associated with a lower surface of the body.

The body may be of any suitable size, shape or configuration. Preferably, however, the body is sized so as to fit within the palm of a user's hand. Ideally, the body is sized so that a user's fingertips extend beyond the body when the device is located in the palm of a user's hand. In this way, a user may use the fingers of the hand holding the shaving device to locate any hair that the user wishes to remove. This not only provides the user with improved control over the shaving device, but also ensures that shaving using the shaving device only requires the use of one hand. This may be particular helpful when the device is used in wet or slippery conditions, such as in the shower, as a user may be able to use their other hand to maintain their balance by holding an object (such as a handrail, tap, water outlet, shower screen or the like).

As previously stated, the upper surface of the body is configured to fit in the palm of a user's hand. Preferably, the upper surface may be configured to facilitate a relatively large surface area of contact with the palm of the user's hand when the user is holding the shaving device. Thus, in a preferred embodiment of the invention, the upper surface of the body may have a contoured shape. Any suitable contoured shape may be provided. However, it is envisaged that the upper surface of the body may be substantially convex over at least a portion of its area. In this embodiment, it is envisaged that the convex portion of the upper surface may be configured to abut the palm of a user's hand when in use. In some embodiments of the invention, substantially the entire upper surface of the body may be provided with a convex or dome shape. However, a flat or concave surface could also be used without departing from the present invention depending upon the intended use or application.

In a preferred embodiment, the body, or at least the upper surface thereof may be at least partially fabricated of a non-slip material or a material having a relatively high coefficient of friction. In this way, the ability of a user to retain the device in their hand may be enhanced or improved. Any suitable material may be used, such as polymeric materials or rubber. In some embodiments of the invention, the upper surface may be entirely fabricated from such a material, may be coated with or provided with an external layer of such a material, or may be provided with one or more regions or patches of such a material. Any suitable non-slip material may be used, such as, but not limited to, neoprene, ethylene propylene diene terpolymer, PVC foam, polyethylene, sponge rubber, silicone foam, urethane, rubber, acrylic, polyester, styrene-butadiene rubber or the like, or a combination thereof.

In a preferred embodiment of the invention, the body may be fabricated from any suitable material, such as metal, plastic, wood, fibreglass or the like. Preferably, the body may be fabricated from a substantially waterproof, water resistant material and/or water impermeable material. Preferably, the body may be fabricated from one or more polymeric materials. In some embodiments of the invention, the body may be fabricated from a relatively rigid polymeric material, such as polyethylene terephthalate, polyetheylene, polyvinyl chloride, polypropylene, polystyrene, polylactic acid, polycarbonate, acrylic, acetal, nylon, acrylonitrile butadiene styrene or the like, or any suitable combination thereof.

The body may be of any suitable shape when viewed from above (i.e. in plan view). For a user's comfort, however, it is envisaged that the body will not be of a shape that includes corners. Thus, the body may be substantially circular, oval or the like.

In a preferred embodiment of the invention, the body may have a longitudinal axis and a latitudinal axis. Preferably, the longitudinal axis of the body is longer than the latitudinal axis of the body. Although the shaving device may be used in any suitable manner by the user, it is envisaged that the longitudinal axis of the body may, in use, substantially align with a longitudinal axis of a user's hand (i.e. the direction in which the fingers extend when the hand is held flat).

In some embodiments of the invention, the body may be provided with one or more grip members. The grip members may be of any suitable form. For instance, the grip members may include one or more recesses in the upper surface of the body into which at least a portion of at least one of the user's fingers may be received. The one or more recesses may be provided with a textured surface, non-slip surface or the like, in order to enhance the user's grip on the grip members. In other embodiments, the one or more grip members may be in the form of projections that extend outwardly from the body, and, in particular, the upper surface of the body. The one or more projections may comprise a knob or projection which may be squeezed between the fingers of the user's hand in order to enhance the user's grip on the device. In other embodiments, the one or more projections may comprise one or more loops through which a user's finger may pass and be retained. In a specific embodiment, the loop may comprise a ring. In another embodiment of the invention the loop may comprise an incomplete ring (i.e. with a cut out portion) configured to allow flex in the inner circumference of the loop to allow fingers of different diameter to pass therethrough.

The body may be manufactured using any suitable technique. Preferably, however, the body may be fabricated by moulding. The body may be at least partially fabricated from a coloured material for enhanced visual appeal and/or ease of location before use.

The lower surface of the body may be provided at any suitable orientation to the upper surface. Preferably, however, the upper and lower surfaces comprise opposing faces of the body.

The lower surface of the body may be of any suitable shape. In some embodiments, the lower surface of the body may be at least partially convex and configured to facilitate passing the at least one cutting blade over the skin surface during use. However, in other embodiments of the invention, the lower surface of the body may be substantially flat, or at least partially concave. It will be understood that the shape of the lower surface may vary depending upon the skin surface on which the shaving device is to be used (for instance, the shape of a device to be used primarily to shave legs may be different to the shape of a device to be used primarily to shave faces).

As previously stated, at least one blade mounting portion is associated with a lower surface of the body. The blade mounting portion may be of any suitable form. However, it is envisaged that the blade mounting portion may be configured to retain one or more cutting blades thereon. Thus, the blade mounting portion may include one or more attachment members configured to engage with the one or more cutting blades in order to retain the one or more cutting blades in position relative to the lower surface of the body. Preferably, the one or more cutting blades are retained in position relative to the lower surface of the body such that, in use, a cutting edge of the one or more cutting blades is capable of being brought into contact with the user's skin.

In some embodiments, the blade mounting portion may include a conventional cartridge razor attachment mechanism.

In other embodiments of the invention the one or more cutting blades may be configured for connection to the blade mounting portion using any suitable technique. For instance, the one or more cutting blades may be connected to the blade mounting portion using a frictional engagement, a screw-threaded connection, a snap connection or the like, or via one or more mechanical fasteners (such as screw, bolts, nails, rivets, staples or the like, or a combination thereof), through the use of adhesives, or using one or more ties, hooks, loops, latches, catches or the like.

In some embodiments of the invention, the shaving device may further comprise one or more cutting blades. In other embodiments, the one or more cutting blades may be provided separately to the shaving device.

The at least one cutting blade may be of any suitable form. Preferably, however, the at least one cutting blade is capable of cutting hair, and in particular human hair. Thus, the one or more cutting blades may comprise razor blades. Any suitable razor blades may be provided, such as one or more stamped razor blades, razor blades provided in one or more cartridges or a combination thereof. In embodiments of the invention in which the one or more cutting blades are provided in a cartridge, any suitable number of razor blades may be provided within the cartridge.

In embodiments of the invention in which the one or more cutting blades are provided in a cartridge, the cartridge may be of conventional construction.

The blade mounting portion may be configured to retain individual cutting blades (such as stamped razor blades) or may be configured to retain a cartridge including one or more cutting blades therein. In some embodiments of the invention, a plurality of stamped razor blades, or a plurality of cartridges, each comprising one or more cutting blades, may be associated with the lower surface of the body. Thus, in this embodiment of the invention, a plurality of blade mounting portions may be located on the lower surface of the body.

Preferably, at least a portion of the one or more cutting blades extend outwardly from the lower surface of the body. More specifically, at least a cutting edge of the one or more cutting blades extends outwardly from the lower surface of the body. In this way, the cutting edge of the one or more cutting blades is configured to be brought into contact with the user's skin. In these embodiments of the invention, it is envisaged that at least a portion of the one or more cutting blades may be housed within the lower surface of the body. Thus, the lower surface of the body may be provided with one or more recesses therein. In some embodiments, the blade mounting portion may comprise, or be located in, a recess.

The one or more cutting blades may be retained in any suitable orientation relative to the body. Preferably, however, the one or more cutting blades may be oriented so that the one or more cutting blades (or the cutting edge of the one or more cutting blades) extend substantially parallel to the latitudinal axis of the body. Thus, in normal use, it is envisaged that the cutting blades may be oriented substantially transverse to the palm of the user's hand.

When connected to the blade mounting portion, the one or more cutting blades may be substantially precluded from movement relative to the body. Alternatively, the one or more cutting blades may be capable of movement relative to the body. In this way, the one or more cutting blades may move with the contours of the user's skin. In some embodiments, the one or more cutting blades may be capable of pivotal movement relative to the body. Specifically, the one or more cutting blades may be capable of pivotal movement relative to the body about the point at which the one or more cutting blades connect to the blade mounting portion.

When a cutting blade requires replacement (such as when the cutting edge becomes dull through use), it is envisaged that the one or more blades may be removed using any suitable technique. For instance, if the cutting blade is retained on the blade mounting portion via a screw-threaded connection, the cutting blade may be screwed off the blade mounting portion.

Preferably, the blade mounting portion is associated with at least one release portion configured to release the cutting blade from the body when actuated by the user. The release portion may be of any suitable form, and may comprise one or more switches, buttons, pull tabs, catches or the like or any suitable combination thereof. The release portion may be provided at any suitable location on the body. However, it is preferred that the release portion may be located in a portion of the body where the risk of the accidental actuation of the release portion during use may be reduced or eliminated. In some embodiments of the invention, the release portion and the blade mounting portion may be formed as separate components and configured for associated with one another. In other embodiments, the blade mounting portion and the release portion may be formed integrally with one another.

In some embodiments of the invention, actuation of the release portion may result in the release or ejection of the one or more cutting blades from the blade mounting portion. In this embodiment of the invention, it is envisaged that the actuation of the release portion may allow a user to discard a used cutting blade into a receptacle (such as a bin) without the user needing to touch the cutting blade. Thus, it is envisaged that the actuation of the release portion in this embodiment may actuate one or more retention members to disconnect the one or more cutting blades from the blade mounting portion.

In other embodiments of the invention, the actuation of the release portion may release at least a portion of the blade mounting portion for movement relative to the body. The blade mounting portion may move relative to the body in any suitable manner. For instance, the blade mounting portion may be configured for sliding, pivoting, telescoping, ratcheting or hinged movement relative to the body upon actuation of the release portion. Thus, it is envisaged that, in some embodiments of the invention, the at least a portion of the blade mounting portion may be configured for movement between a use condition and a release condition upon actuation of the release portion. Thus, it is envisaged that the actuation of the release portion in this embodiment may actuate one or more retention members to at least partially disconnect or release the blade mounting portion from the body.

Preferably, when the blade mounting portion is in the use condition, the one or more cutting blades are positioned relative to the body such that a user can use the shaving device for shaving. It is envisaged that, in the release condition, the one or more cutting blades are positioned away from the body, thereby allowing for the convenient removal of the used cutting blades and the replacement with a new cutting blade. Specifically, in the release portion the one or more cutting blades may be disconnected or removed from the blade mounting portion.

The one or more cutting blades may be positioned any suitable distance away from the body in the release position. Preferably, the one or more cutting blades are positioned away from the body in the release position by at least a portion of the length of the blade mounting portion. The blade mounting portion may move to any suitable position relative to the body, and it will be understood that the orientation of the blade mounting portion (and the one or more cutting blades) relative to the body in the release condition is not critical to the invention. However, in a specific embodiment of the invention, the blade mounting portion may be oriented substantially parallel to the lower surface of the body in the release condition.

Preferably, the shaving device may be provided with one or more consumable regions. The consumable regions may be of any suitable form, although it is envisaged that the consumable regions may include a consumable substance. Preferably, during use of the shaving device, the consumable substance may be released. Preferably, the consumable substance may be released onto the user's skin. The consumable substance may be of any suitable form, and may include shaving cream, shaving gel, shaving foam, soap, moisturiser, a skin-soothing substance or the like, or any suitable combination thereof.

The consumable substances may be provided as pads, bars or the like located on an outer surface of the body, or may be dispensed from reservoirs within the body.

The consumable regions may be provided at any suitable location on the device. For instance, the consumable regions may be provided on the lower surface of the device. In some embodiments of the invention, the consumable regions may be provided on a cartridge within which one or more cutting blades are located.

Preferably, the consumable substances may be mounted in a lower surface of the body via a substance mounting portion configured to allow retainment of the consumable substance within the body and allow contact of an outer surface of the consumable substance with the skin of the user during use.

Preferably, the shaving device may also comprise a vibration mechanism to facilitate vibration of the body during use. In this way, hair on the skin area to be shaved is lifted away from the body before cutting by the at least one cutting blade to provide a closer shave. The vibration mechanism may include a motor. The motor may be powered using any suitable power source, although in a preferred embodiment of the invention, the motor may be powered using one or more batteries. In a preferred embodiment of the invention, the one or more batteries may be housed within the body.

In another aspect, the invention resides broadly in a shaving device comprising: a body comprising a contoured upper surface configured to fit into the palm of a user's control hand; and a grip portion extending from the contoured upper surface which is gripped by the user's control hand during use wherein the shaving device also comprises at least one cutting blade mounted in a lower surface of the body wherein the longitudinal axis of the cutting blade is transverse to a long axis of the user's control hand.

The present invention provides a number of advantages over the prior art such as improved control and ease of use when shaving due to the ergonomic palm fit of the shaver body and the ability to simultaneously feel the skin being shaved via the fingertips of the same hand of the user. This improved control provides improved efficiency of shaving and an improved end result, as well as being safer for a person to use, particularly in a slippery or wet environment such as a shower.

In the present specification and claims (if any), the word 'comprising' and its derivatives including 'comprises' and 'comprise' include each of the stated integers but does not exclude the inclusion of one or more further integers.

Any of the features described herein can be combined in any combination with any one or more of the other features described herein within the scope of the invention

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 5 shows a perspective view of the embodiment shown in FIG. 4.

FIG. 6 shows a side view of the embodiment shown in FIG. 4.

FIG. 7 shows a bottom view of the embodiment shown in FIG. 4.

FIG. 8 shows a top view of the embodiment shown in FIG. 4.

DESCRIPTION OF EMBODIMENTS

Figure 1A:
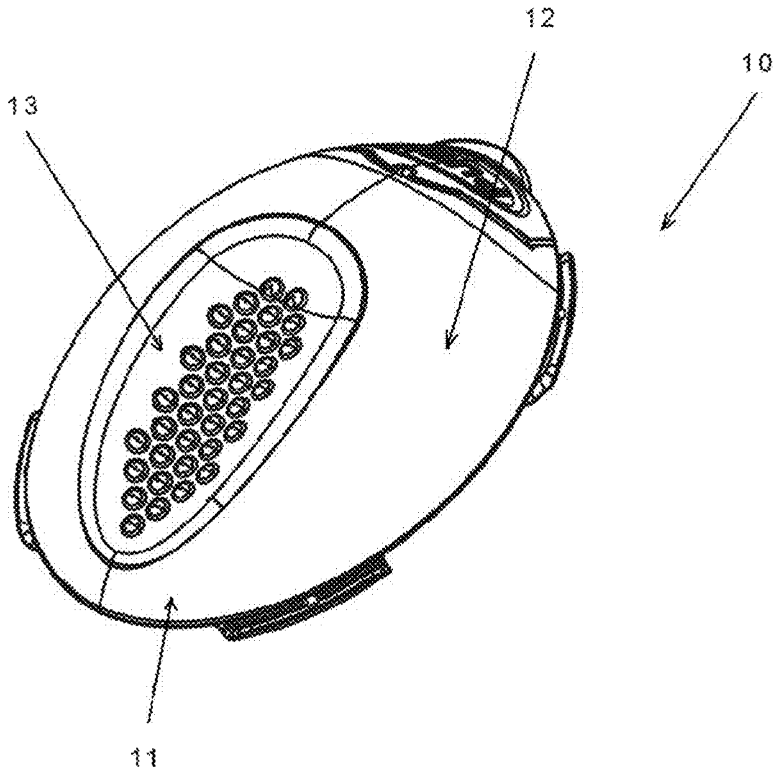
FIGS. 1A and 1B illustrate a shaving device according to an embodiment of the present invention in the use condition.
Figure 1B:
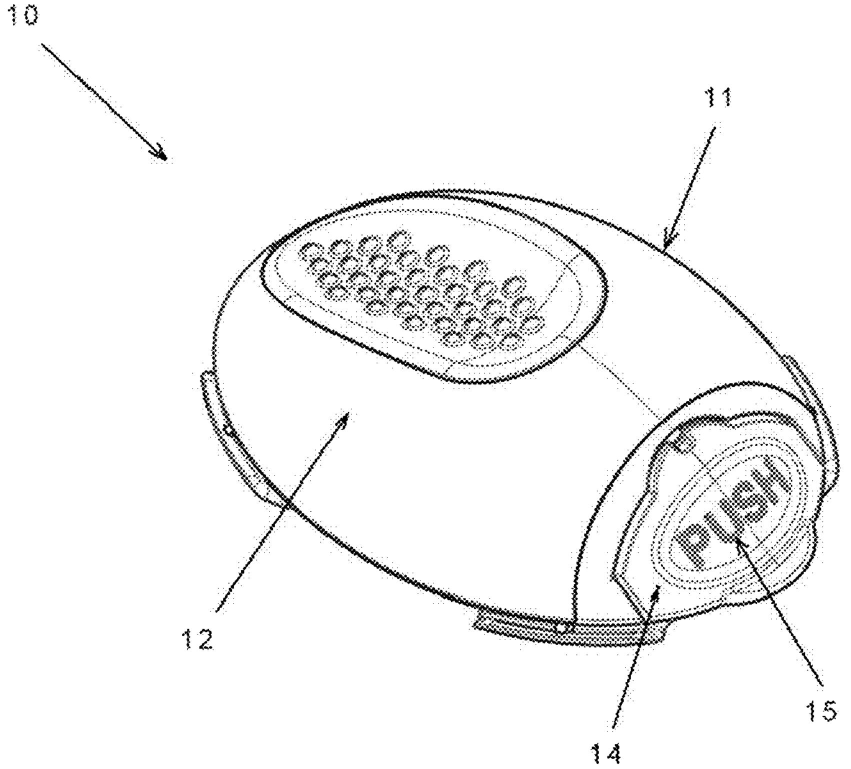

FIGS. 1A and 1B illustrate a shaving device 10 according to an embodiment of the present invention in the use condition. The shaving device 10 includes a body 11 having an upper surface 12 that is substantially convex in shape. The convex upper surface 12 of the body 11 is configured to be retained in the palm of a user's hand (not shown) and to abut the palm of the hand when in use.

The upper surface 12 includes a region or patch 13 of non-slip material thereon. The region or patch 13 is fabricated from PVC and is recessed into the upper surface 12 of the body 11 to provide a user with a comfortable location to place one or more fingers (not shown) when holdings the device 10. Thus, it is envisaged that the user's fingers will be oriented in the same orientation as the region or patch 13 when the device 10 is in use.

The upper surface 12 is provided with a release portion 14. The release portion 14 is in the form of a button located at an end of the device 10. In use, it is envisaged that the release portion 14 will be positioned adjacent the heel of the user's hand (not shown) so ad to reduce or eliminate the accidental actuation of the release portion 14. The release portion 14 shown in FIG. 1 is provided with indicia 15 to indicate to a user how to actuate the release portion 14.

Figure 2A:
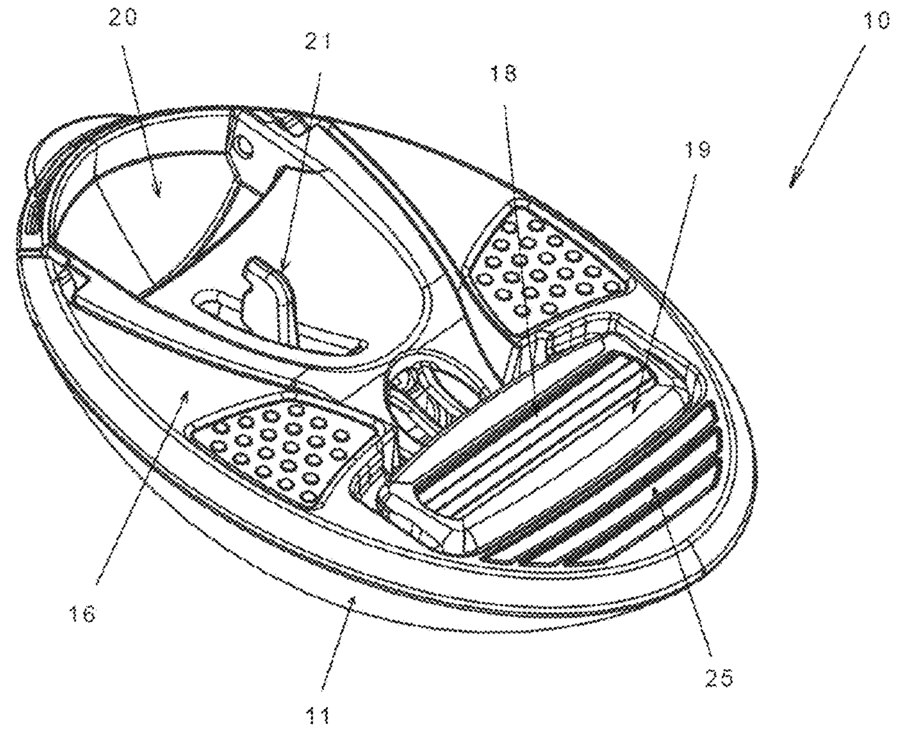
FIGS. 2A and 2B illustrate a shaving device according to an embodiment of the present invention in the use condition.
Figure 2B:
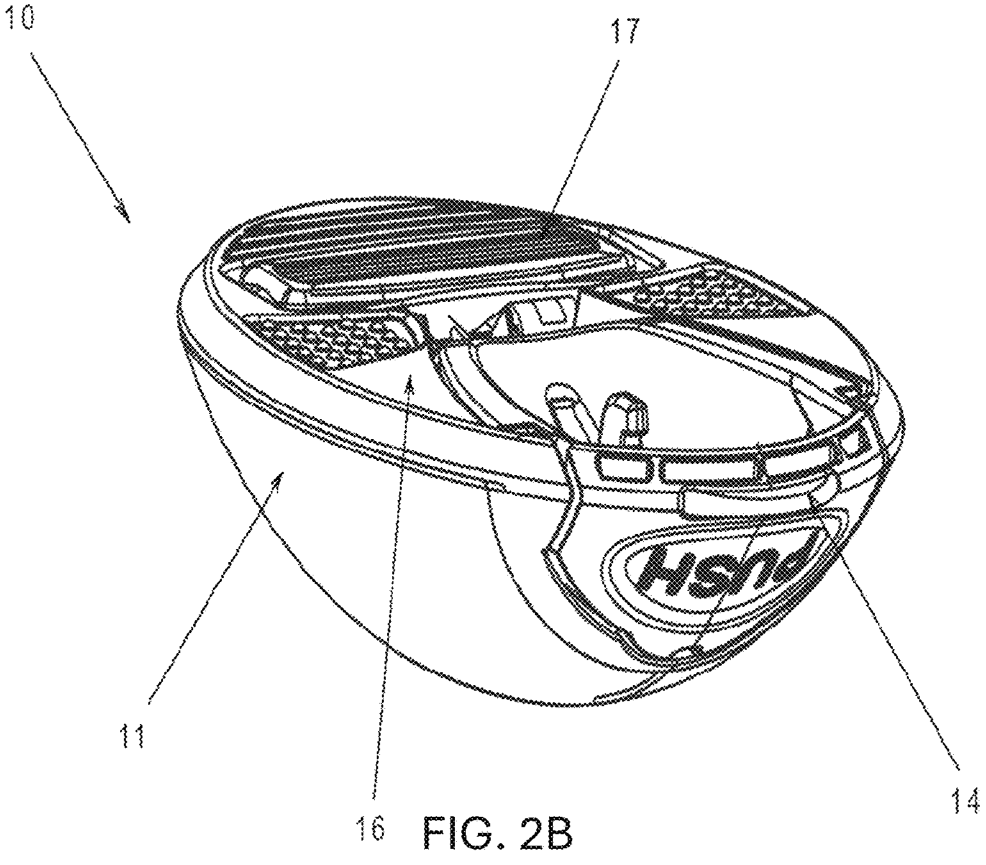

FIGS. 2A and 2B illustrate a shaving device 10 according to an embodiment of the present invention in the use condition. The shaving device 10 of FIGS. 2A and 2B is identical to that shown in FIGS. 1A and 1B.

In FIGS. 2A and 2B, the device 10 has been turned over so show the lower surface 16 of the body 11. A cartridge 17 including a plurality of cutting blades 18 is associated with the lower surface 16. In use, the lower surface 16 of the device 10 is located against the user's skin so that, as the device 10 is drawn across the user's skin, the cutting blades 18 cut any hair located thereon.

The cartridge 17 is provided with regions 19 of a consumable substance. In this case, the consumable substance is lubricating substance configured to improve the cutting efficiency of the blades 18 and reduce friction on, and irritation to, the user's skin.

In the embodiment of the invention shown in FIGS. 2A and 2B, the cartridge 17 is located within a recess (obscured) in the lower surface 16 of the body 11. The cartridge 17 is positioned so that the cutting edges of the cutting blades 18 project outwardly from the lower surface 16, thereby allowing the cutting edges of the cutting blades 18 to be brought into contact with a user's skin.

The lower surface 16 of the body 11 is provided with a plurality of fins 25 therein. The fins 25 may assist in reducing friction against the user's skin when in use.

In FIGS. 2A and 2B, the cutting blades 18 are oriented substantially transverse to the longitudinal axis of the device 10 (i.e. the axis extending between the release portion 14 and the cartridge 17).

The cartridge 17 is mounted to a blade mounting portion 20. The blade mounting portion 20 is associated with the release portion 14, such that actuation of the release portion 14 results the movement of the blade mounting portion 20 between the use condition shown in FIGS. 2A and 2B and the release condition. In FIGS. 2A and 2B, the release portion 14 and the blade mounting portion 20 are formed integrally with one another.

In the use condition, the blade mounting portion 20 is retained in place within a recess in the lower surface 16 by a retention member 21 extending from the lower surface 16. Actuation of the release portion 14 releases the blade mounting portion 20 from its engagement with the retention member 21 so that the blade mounting portion 20 may move from the use condition to the release condition.

Figure 3A:
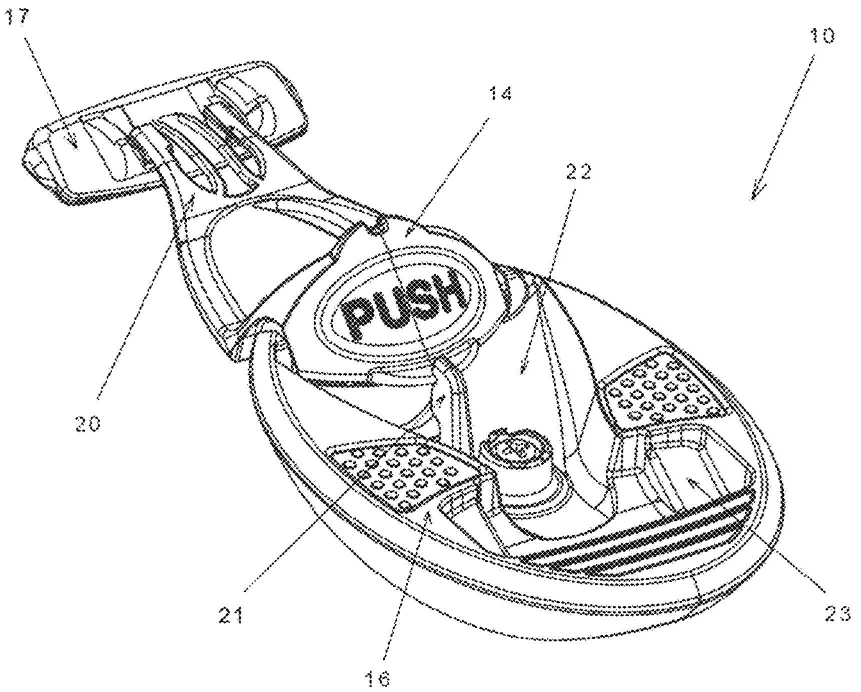
FIGS. 3A and 3B illustrate a shaving device according to an embodiment of the present invention in the release condition.
Figure 3B:
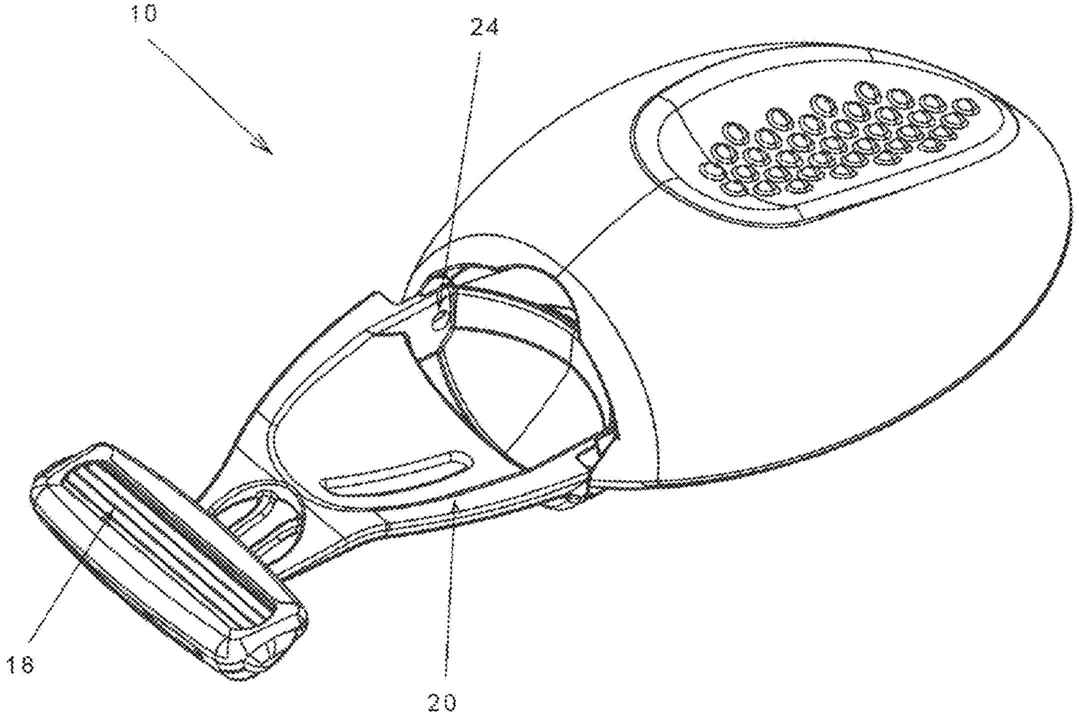
Figure 4:
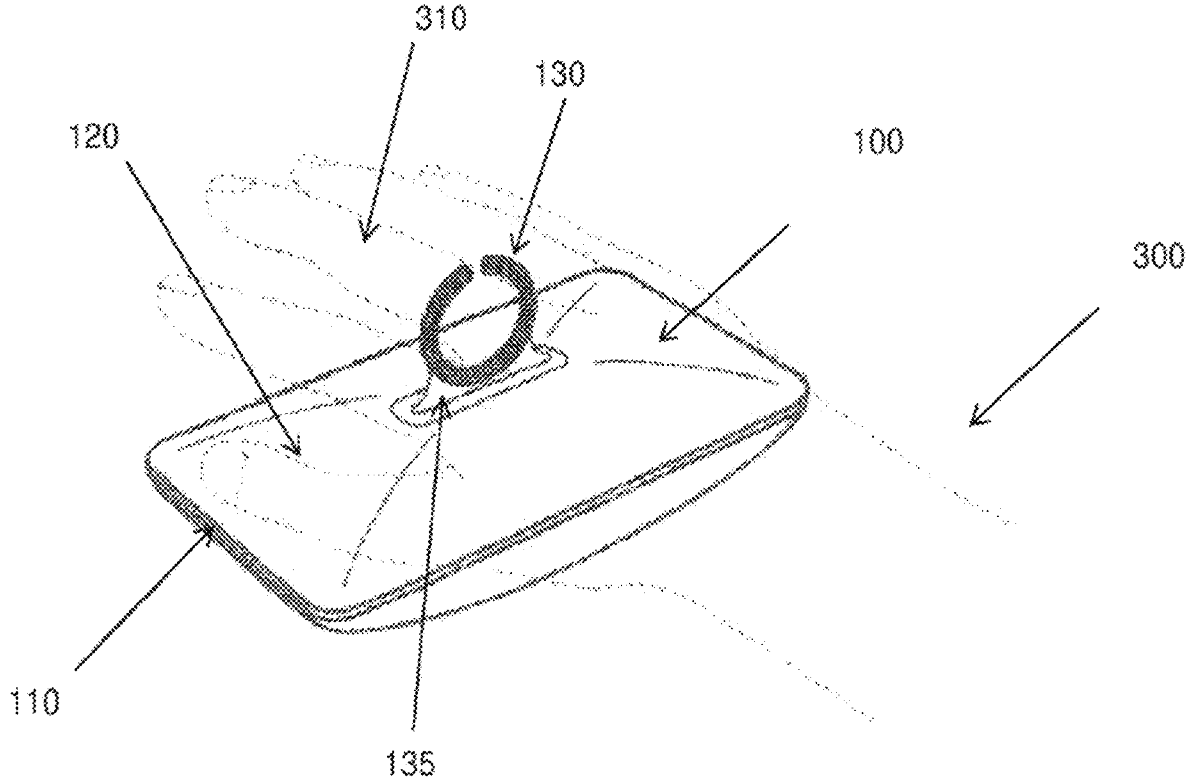
FIG. 4 shows a perspective view of an embodiment of the present invention in the form of a shaving device attached to a user's hand.

FIGS. 3A and 3B illustrate a shaving device 10 according to an embodiment of the present invention in the release condition. In these Figures, the release portion 14 has been actuated, thereby releasing the blade mounting portion 20 for movement from the use condition to the release condition. Once released from the use condition, the blade mounting portion 20 pivots about a pair of pivot pins 24 to move from the use condition to the release condition (and vice versa).

In the release condition, the cartridge 17 (and therefore the cutting blades 18) are located spaced away from the body 11. This makes replacing the cartridge 17 quick and easy, and the risk of a user cutting their fingers on the cutting blades 18 is reduced or eliminated. The retention member 21 also retains the blade mounting portion 20 in the release condition, until the user manually returns the blade mounting portion 20 to the use condition (for instance, once a new cartridge has been attached to the blade mounting portion 20).

In FIG. 3A, the recess 22 in the lower surface 16 within which the blade mounting portion 20 is located in the use condition may be better seen. The recess 22 includes a cartridge receiving portion 23 shaped to house a cartridge 17 therein.

FIGS. 4 to 8 illustrate a shaving device 100 according to an alternative embodiment of the present invention. The shaving device 100 generally comprises a low profile body 110 moulded from non-slip rubber or plastic comprising a contoured upper surface 120 in a convex profile configured to fit securely into the palm of a user's hand 300 and a grip portion in the form of a finger loop 130 extending from the contoured upper surface 120 via a base 135 through which at least one finger 310 of the user's hand 300 is inserted before use wherein the shaving device 100 also comprises a pair of cutting blades (140), in the form of conventional disposable razor blades (such as quad-blades in a known size) mounted in a convex lower surface (150) of the body (110) wherein the longitudinal axis of the cutting blade (140) is transverse to a long axis of the user's control hand (300). Such conventional disposable razor blades (140) provide safety if picked up inadvertently by children.

The convex upper surface (120) is configured to facilitate a large surface area of contact with the palm of the user's control hand (300) when gripping the shaving device (100). The body (110) may also comprise at least one grip surface (not shown) positioned on the contoured upper surface (120) to facilitate gripping in the user's control hand (300).

The finger loop (130) is in the form of a ring with a cut out portion (130A) configured to allow flex in the inner circumference of the finger loop (130) to allow fingers of different diameter to pass through the finger loop (130).

The convex lower surface (150) is configured to facilitate passing the pair of cutting blades (140) over the skin surface during use. The pair of cutting blades (140A and 140B) are each mounted in the convex lower surface (150) via a cutting blade mount portion in the form of a pocket (145; as shown in FIG. 6) to allow retainment of the cutting blade (140) pair member within the body (100) in a substantially flush position in relation to the convex lower surface (150) and contact a cutting edge of the cutting blade (140) with the skin of the user during use. The cutting blade mount portion comprises at least one release portion such as a button (not shown) configured to release the cutting blade (140) from the body (110) when actuated by the user.

The shaving device (100) also comprises three moisturising pads (160A, 160B and 160C) mounted in the convex lower surface (150) and configured to allow moisturising of the user's skin during use of the shaving device (100). In this way, it is not necessary to use shave gel or foam during use of the shaving device. Each of the moisturising pads (160A, 160B and 160C) are mounted in the convex lower surface (150) via a moisturising pad mount portion (not shown) configured to allow retainment of the moisturising pads (160A, 160B and 160C) within the body (110) and allow contact of an upper surface of the moisturising pad with the skin of the user during use. The moisturising pads (160A, 160B and 160C) are not envisaged to be removed from the body and would last the lifetime of the shaving device (100).

The shaving device may also comprise a vibration mechanism in the form of a battery powered motor (not shown) to facilitate vibration of the body (110) during use. In this way, hair on the skin area to be shaved is lifted away from the body before cutting by the at least one cutting blade to provide a closer shave.

The shaving device (100) may be sold alone or as a kit of parts comprising the shaving device (100) itself and spare cutting blades.

In use, the shaving device (100) is gripped in the palm of a user's hand (300) and (usually) the index finger (310) is inserted through the finger loop (130). The user's skin is shaved by moving the shaving device (100) in an up and down motion in the direction of longitudinal axis AA (as shown in FIG. 7). Simultaneously, the user can feel the skin area that is being shaved with the fingertips of the control hand (300) to easily gauge whether In this way, the shaving device (100) with its compact and low profile shape provides for improved control and comfort, particularly for users which find it painful to grip a handle of a conventional razor (such as those users with rheumatoid arthritis), and improved ease of use to shave curved surfaces such as armpits or heads. The improved efficiency cuts down the time needed to shave (by up to half).

Therefore the present invention provides a number of advantages over the prior art such as improved control and ease of use when shaving due to the ergonomic palm fit of the shaver body and the ability to simultaneously feel the skin being shaved via the fingertips of the same (control) hand of the user. This improved control provides improved efficiency of shaving and an improved end result.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A shaving device comprising a body having an upper surface configured to fit in the palm of a user's hand, the shaving device further comprising at least one blade mounting portion associated with a lower surface of the body, the blade mounting portion configured to retain one or more cutting blades thereon, wherein the one or more cutting blades can pivot between a use condition and a release condition relative to the body.

2. A shaving device according to claim 1, wherein the upper surface of the body is substantially convex over at least a portion of its area.

3. A shaving device according to claim 2, wherein a convex portion of the upper surface is configured to abut the palm of the user's hand when in use.

4. A shaving device according to claim 1, wherein the upper surface is at least partially fabricated of a non-slip material or a material having frictional resistance to enhance grip of the user's hand against the upper surface of the shaving device.

5. A shaving device according to claim 1, wherein the body has a longitudinal axis and a latitudinal axis, the longitudinal axis being longer than the latitudinal axis, and wherein, in use, the longitudinal axis of the body substantially aligns with a longitudinal axis of the user's hand.

6. A shaving device according to claim 1, wherein the upper surface and the lower surface comprise opposing faces of the body.

7. A shaving device according to claim 1, wherein the lower surface of the body is substantially flat or at least partially concave.

8. A shaving device according to claim 1, wherein the blade mounting portion includes one or more attachment members configured to engaged with the one or more cutting blades.

9. A shaving device according to claim 1, wherein, when retained on the blade mounting portion, at least a cutting edge of the one or more cutting blades extends outwardly from the lower surface of the body.

10. A shaving device according to claim 9, wherein the one or more cutting blades are oriented substantially transverse to the palm of the user's hand.

11. A shaving device according to claim 1, wherein the lower surface of the body is provided with one or more recesses in, the blade mounting portion being located in the one or more recesses.

12. A shaving device according to claim 1, wherein the blade mounting portion is associated with a release portion.

13. A shaving device according to claim 12, wherein actuation of the release portion releases at least a portion of the blade mounting portion for movement relative to the body.

14. A shaving device according to claim 13, wherein the release portion comprises one or more switches, buttons, pull tabs or catches.

15. A shaving device according to claim 13, wherein the blade mounting portion is configured for pivoting movement relative to the body between the use condition and the release condition.

16. A shaving device according to claim 15, wherein, in the release condition, the one or more cutting blades are positioned away from the body by at least a portion of the length of the blade mounting portion.

17. A shaving device according to claim 15, wherein, in the release condition, the blade mounting portion is oriented substantially parallel to the lower surface of the body.

18. A shaving device according to claim 15, wherein, when the blade mounting portion is in the release condition, the one or more cutting blades are able to be disconnected from the blade mounting portion.

19. A shaving device according to claim 1, wherein the device is provided with one or more consumable regions on the lower surface thereof.

20. A shaving device according to claim 19, wherein the consumable regions include a consumable substance.

21. A shaving device comprising a body having an upper surface configured to fit in the palm of a user's hand, the shaving device further comprising at least one cutting blade associated with a lower surface of the body, wherein the at least one cutting blade can pivot between a use condition and a release condition relative to the body.

* * * * *